(12) United States Patent
Shasha et al.

(10) Patent No.: US 9,171,271 B2
(45) Date of Patent: Oct. 27, 2015

(54) COMPUTER SYSTEM, CLIENT DEVICE AND METHOD

(75) Inventors: Dennis Shasha, New York, NY (US); Arthur Meacham, Brooklyn, NY (US)

(73) Assignee: New York University, New York, NY (US)

( * ) Notice: Subject to any disclaimer, the term of this patent is extended or adjusted under 35 U.S.C. 154(b) by 920 days.

(21) Appl. No.: 12/657,247

(22) Filed: Jan. 15, 2010

(65) Prior Publication Data
US 2011/0179285 A1    Jul. 21, 2011

(51) Int. Cl.
*H04L 9/00* (2006.01)
*G06Q 10/06* (2012.01)

(52) U.S. Cl.
CPC ..................... *G06Q 10/06* (2013.01)

(58) Field of Classification Search
CPC ................. H04L 63/00; G06F 30/00
USPC ......... 709/201, 223, 225, 238; 705/3; 726/64, 726/75; 718/101
See application file for complete search history.

(56) References Cited

U.S. PATENT DOCUMENTS

| | | | | |
|---|---|---|---|---|
| 2004/0111619 A1* | 6/2004 | Laurie et al. | ................... | 713/179 |
| 2005/0044280 A1* | 2/2005 | Reisman | ........................... | 710/1 |
| 2007/0288254 A1* | 12/2007 | Eisner | ................. | 705/1 |
| 2008/0041936 A1* | 2/2008 | Vawter | ......................... | 235/380 |
| 2009/0089614 A1* | 4/2009 | Eguchi et al. | ................... | 714/15 |
| 2010/0154048 A1* | 6/2010 | Yuan et al. | ....................... | 726/10 |

* cited by examiner

*Primary Examiner* — Joseph P Hirl
*Assistant Examiner* — Leynna Truvan
(74) *Attorney, Agent, or Firm* — Ansel M. Schwartz

(57) ABSTRACT

A computer system includes a network. The system includes a first client device in communication with the network having a transaction description for a transaction t. The first client device sends the transaction description to a second client device. The second client device receives the transaction description from the first client device. One of the first or second client devices executes the transaction description and creates a second transaction description for transaction t and then sends the second transaction description to a client device. A client device of a computer system having a network and a second client device. A method of a computer system. A method of a client device of a computer system having a network and a second client device.

21 Claims, 4 Drawing Sheets

TrustMeNot Reliable Storage Backend.
*Stores encrypted data in append-only log, plus occasional full database dumps*

Conduit – can belong to TrustMeNot
*Orders read-write transactions consistently for all clients*

Client
*Holds copy of the database. Read-only transactions local. Others go through Conduit*

.....

Client
*Holds copy of the database. Read-only transactions local. Others go through Conduit*

COMPUTER SYSTEM, CLIENT DEVICE AND METHOD

FIELD OF THE INVENTION

The present invention is related to a computer system having a first client device having a transaction description for a transaction t and at least a second client device in communication through a network with the first client device where one of the client devices executes the transaction description and creates a second transaction description for transaction t and then sends the second transaction description to a client device. (As used herein, references to the "present invention" or "invention" relate to exemplary embodiments and not necessarily to every embodiment encompassed by the appended claims.) More specifically, the present invention is related to a computer system having a first client device having a transaction description for a transaction t and at least a second client device in communication through a network with the first client device where one of the client devices executes the transaction description and creates a second transaction description for transaction t and then sends the second transaction description to a client device and the first client device is able to understand all data read in the first transaction description, and another client device is not able to understand all the data in the first transaction description.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The present invention extends the Blind Stone Tablet paper [1] by Williams et al. That paper introduced a system that supports all of SQL, is distributed, ensures that a putative outsourcing provider TrustMeNot sees only encrypted data, and ensures "access privacy." Access privacy is the concept that the outsourcing provider TrustMeNot does not know which data clients are accessing regardless of the transaction type. Like that paper, this embodiment guarantees access privacy by essentially the same technique: each client holds a copy of the database so when a client issues a read-only transactions, it does so on local data. When a client issues a read-write transaction (i.e. a transaction that performs at least some insert, delete, or modification) it sends its transaction description in encrypted form to TrustMeNot. So, TrustMeNot records a log of encrypted transaction descriptions, but does not know which data is accessed because all data accesses go to client-local databases. (Periodically, a client may dump an entire database state or download the entire database state for recovery purposes. Such operations preserve access privacy.)

The present invention involves a variant of the algorithm from [1] that guarantees access privacy, deadlock freedom, and wait-freedom. Wait-freedom, a concept introduced by Maurice Herlihy, is the idea that if a client slows down or fails, other clients can still continue making progress. This invention then extends that algorithm to accommodate large data at some loss in access privacy. This invention also extends that algorithm to allow different clients to have access to different data.

Whereas a direct predecessor of the present invention is the Blind Stone Tablet paper, this work has been heavily influenced by other research. The paper on k-anonymity by Samarati and Sweeney [2] introduced an entire approach to understanding the implications that aggregate queries could have on the privacy of individuals. Whereas others have chosen to establish positive results based on this idea, e.g. by making k large, the present invention preferred to follow the Blind Stone Tablet absolutist approach of full access privacy. As this approach to blobs requires some compromise, it was foreseen in future developments that make use of these fundamental concepts, as is done for example in [3] which stores some information on the client and some on the server.

In addition, the algorithms for searching encrypted data for XML query processing [4], range queries [5,6], and aggregates [7] shows that much can be done on such data if accesses are limited to queries. As for work that tries to handle large portions of SQL in the spirit of Hacigumus et al. [8], the idea of mixing public and private data with some guarantee of something close to k-anonymity is desired.

Finally, there is work concerned with guaranteeing the integrity of databases [9,11], audit logs [10], and data structures [12] that inspires the method Blind Stone Tablet (and we) use to establish fork consistency.

BRIEF SUMMARY OF THE INVENTION

The present invention pertains to a computer system. The computer system comprises a network. The system comprises a first client device in communication with the network having a transaction description for a transaction t. The first client device sends the transaction description to a second client device. The second client device receives the transaction description from the first client device. One of the first or second client devices executes the transaction description and creates a second transaction description for transaction t and then sends the second transaction description to a client device.

The present invention pertains to a client device of a computer system having a network and a second client device. The client device comprises a network interfacing unit in communication with the second client device through the network. The client device comprises a memory having a transaction description for a transaction t. The network interfacing unit sends the transaction description to the second client device. The client device comprises a processing unit for executing the transaction description from the memory to create a second transaction description for transaction t. The network interfacing unit sends the second transaction description to a client device through the network.

The present invention pertains to a method of a computer system. The method comprises the steps of sending a transaction description for a transaction t from a first client device to a second client device through a network. There is the step of receiving at the second client device the transaction description from the first client device. There is the step of executing by one of the first or second client devices the transaction description and to create a second transaction description for transaction t. There is the step of sending the second transaction description to a client device through the network.

The present invention pertains to a method of a client device of a computer system having a network and a second client device. The method comprises the steps of sending a transaction description for a transaction t stored in a memory from a network interfacing unit to the second client device through the network. There is the step of executing with a processing unit the transaction description from the memory to create a second transaction description for transaction t.

There is the step of sending the second transaction description from the network interfacing unit to a client device through the network.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 3:
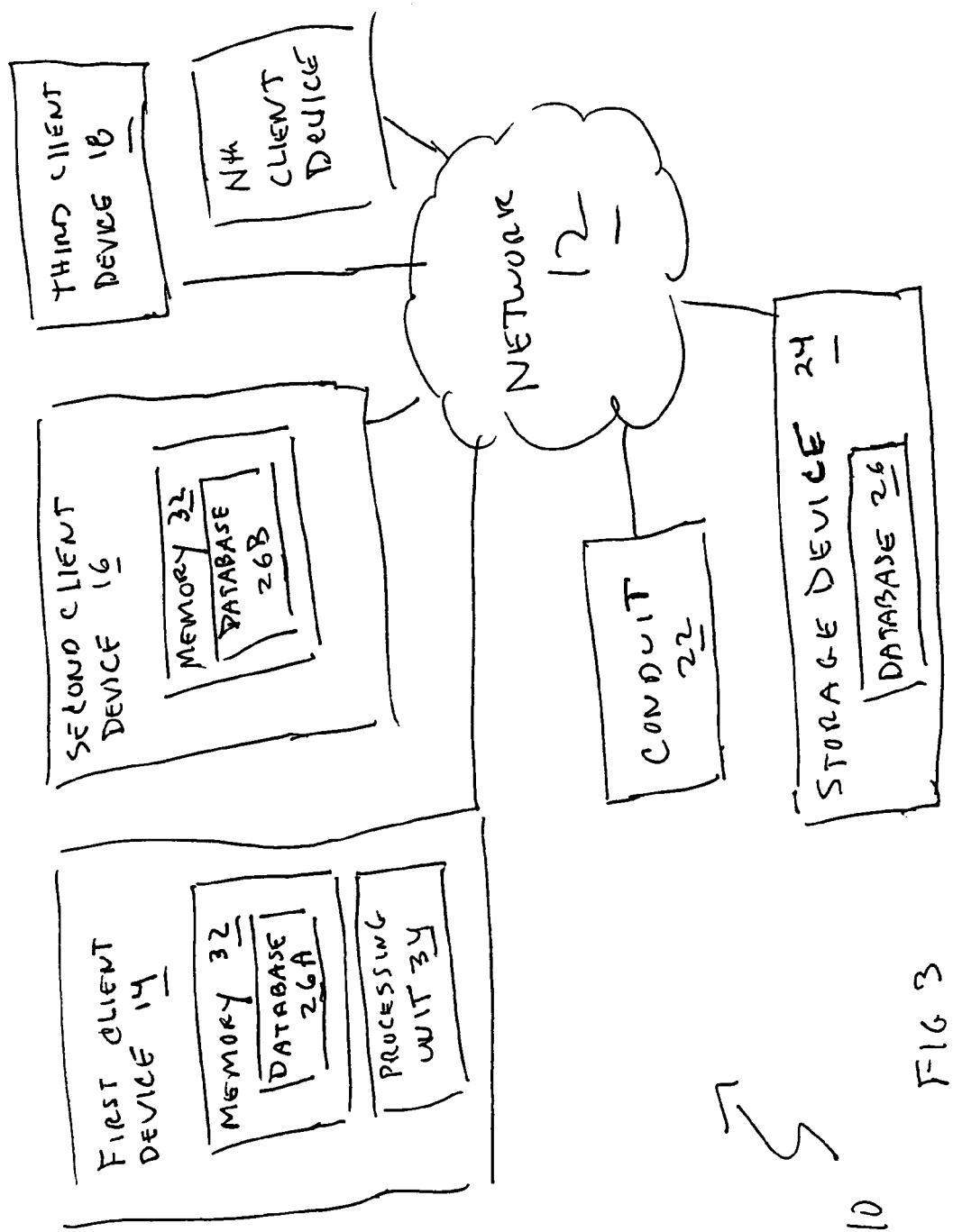
FIG. 3 is a block diagram of a computer system of the present invention.

Referring now to the drawings wherein like reference numerals refer to similar or identical parts throughout the several views, and more specifically to FIG. 3 thereof, there is shown a computer system 10. The computer system 10 comprises a network 12. The system 10 comprises a first client device 14 in communication with the network 12 having a transaction description for a transaction t. The first client device 14 sends the transaction description to a second client device 16. The second client device 16 receives the transaction description from the first client device 14. One of the first or second client devices 14, 16 executes the transaction description and creates a second transaction description for transaction t and then sends the second transaction description to a client device 28. Each client has a copy of at least some of a database, consisting of data items (which may be tables, arrays, or other data structures) and their values. That is the data items in 26A may differ from those in 26B. Even when two databases, for example 26A and 26B, have the same data item x, the value of that data item x may differ at a particular time in 26A from the value in 26B because, for example, x may be changed in 26A before it is changed on 26B.

The database 26 consists of zero or more data items and values (called a database state) plus a sequence of transaction descriptions. The database 26 and the storage device 24 may also contain "blobs" which are simply data items held on 26 within storage device 24, but not on any client device. If a sequence of transaction descriptions are applied to a database state that would result in a new database state. For example, if there have been 2,000 transactions executed in the life of some database application and there is a database state reflecting the first 500 transactions in the storage device 24, then applying in sequence the 1500 transaction descriptions corresponding to the last 1500 transactions would result in a new database state. The intent is that this new database state would constitute the correct database state after those 2000 initial transactions. Sometimes there will be two or more transaction descriptions corresponding to a particular transaction in which case only one (normally the last one) need be applied. For example, if a transaction description specifies a read to blob data and then a write to non-blob data, then a second transaction description may specify only the changes to non-blob data.

The first client device 14 may have a memory 32 with data and a processing unit 34 and the first client device 14 executes the first transaction description and the first client device 14 is able to understand all the data read in the first transaction description, and the second client device 16 is not able to understand all the data in said first transaction description (for example, either because the second client doesn't possess the relevant data items in its database (or a portion thereof) or because the data in the transaction description (or a portion thereof) is encrypted in such a way that the second client can't understand it). The second client device 16 may perform the second transaction description. The second client device 16 may have a memory 32 with records and the second transaction description from the first client device 14 may inform the second client device 16 which records to modify or insert and how to modify or insert the records. For example, the first transaction description may specify to read data R and compute some summary data about R and then write those summaries to S. The second transaction description may specify which summary values to write to S. The second client device 16 may perform the first transaction description and send the second transaction description to the first client device 14.

The system 10 may include a third client device 18 in communication with the network 12, and wherein the second client device 16 executes the first transaction description and the third client device 18 does not understand all the data read in the first transaction description. The system 10 may include a storage device 24 having a portion of a database 26 having data in communication with at least one client device 28. Each client device 28 may have at least a portion of the data items of the database 26 and performs at least a portion of read-only transactions locally. The system 10 may include a conduit 22 in communication with the storage device 24 and each client device 28 through the network 12, wherein all read-write transactions pass through the conduit 22. The conduit 22 may order read-write transactions consistently for all clients. The conduit 22 may save the transaction description text describing the transaction description in encrypted form in the storage device 24.

The first transaction description may entail an access to data (including blob data) in the database 26 of the storage device 24 and the first transaction description further enables:

i) at least one of the first or second client devices 14, 16, denoted cA, accesses data on the database 26 of the storage device 24 and, if the data on the database 26 is changed, client device cA copies and stores the changed data in a new location on said storage device 24;

ii) at least client device cA obtains shared or exclusive access to some data determined by the first transaction description.

The first transaction description may further enable the obtaining of shared or exclusive access to occur on at least client device cA before any data pertaining to the first transaction description is accessed. The first transaction description may enable encryption of data on one of the first and second client devices 14, 16 to prevent at least one client device from being able to produce cleartext data from some encrypted data.

The system may include instructions in which each transaction is executed in three phases:

i) an announcement phase in which the first client device 14 of the transaction description informs, either directly or indirectly through the conduit 22, at least the second client device 16 of the data on which the second client device 16 must gain shared or exclusive access;

ii) a performance phase in which at least one, c1, of the first and second client devices 14, 16 accesses at least some of the data (where the data may be blob data on database 26) pertaining to the transaction description; and iii) a completion phase in which client device c1 sends a message, directly or indirectly through the conduit 22, to another client device 28 (of FIG. 4) the second transaction description that the other client device 28 must perform on data contained within the other client device 28.

Typically, both the first and second transaction descriptions will be sent to the storage device 24.

The instructions may further enable the client device c1, if it is not the first client device 14, to inform the first client device 14 what the return values of the transaction should be.

Figure 4:
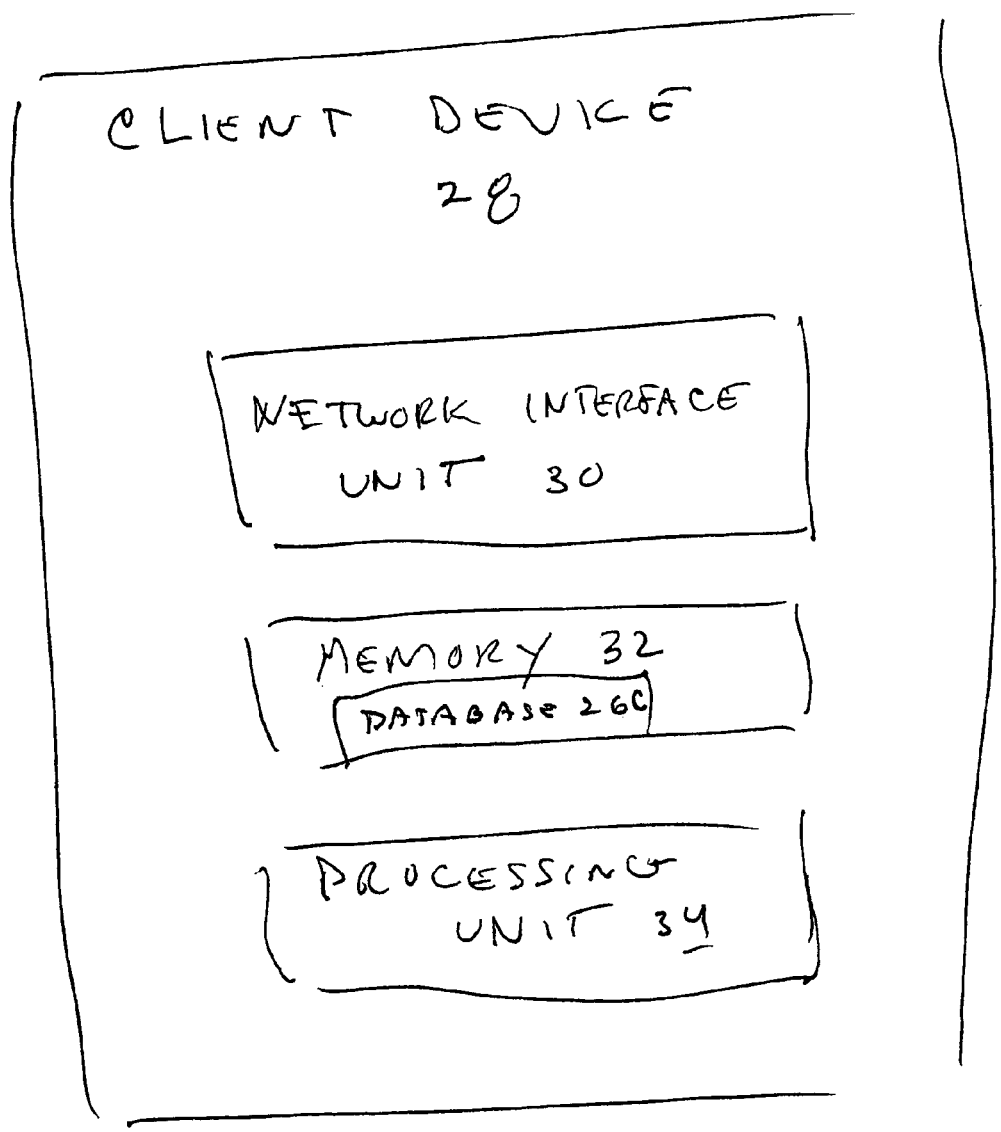
FIG. 4 is a block diagram of a client device of the present invention.

Referring to FIG. 4, the present invention pertains to a client device 28 of a computer system 10 having a network 12 and a second client device 16. The client device 28 comprises a network interfacing unit 30 in communication with the second client device 16 through the network 12. The client device 28 comprises a memory 32 having a transaction description for a transaction t. The network interfacing unit 30 sends the transaction description to the second client device 16. The client device 28 comprises a processing unit 34 for executing the transaction description from the memory 32 to create a second transaction description for transaction t. The network interfacing unit 30 sends the second transaction description to a client device 28 through the network 12.

The present invention pertains to a method of a computer system 10. The method comprises the steps of sending a transaction description for a transaction t from a first client device 14 to a second client device 16 through a network 12. There is the step of receiving at the second client device 16 the transaction description from the first client device 14. There is the step of executing by one of the first or second client devices 14, 16 the transaction description to create a second transaction description for transaction t. There is the step of sending the second transaction description to a client device 28 through the network 12.

The present invention pertains to a method of a client device 28 of a computer system 10 having a network 12 and a second client device 16. The method comprises the steps of sending a transaction description for a transaction t stored in a memory 32 from a network interfacing unit 30 to the second client device 16 through the network 12. There is the step of executing with a processing unit 34 the transaction description from the memory 32 to create a second transaction description for transaction t. There is the step of sending the second transaction description from the network interfacing unit 30 to a client device 28 through the network 12.

In the operation of the invention, imagine an enterprise called Customer who wants to store data in a database 26 of storage device 24 that is robust to hardware and fail-stop software failures and that is distributed across many client sites. Customer would like to avoid ensuring fault tolerance, durability, and distributed transactions because those features require a level of hardware infrastructure (dual backup sites, special disk configurations) and skill set (reliability experts) that Customer cannot afford or would rather not pay for. So, Customer engages an outsourcing organization which we will call TrustMeNot to perform this functionality. The trouble is that Customer doesn't trust TrustMeNot.

The system 10 of the present invention, OutSafe provides the following guarantees:

1. Customer clients can use simple single site database management systems locally. All database management system operations are possible including single record retrievals, complex queries, inserts, deletes, and updates. There is no requirement that the underlying database management system even be relational. Arbitrary transactions on data are allowed.

2. TrustMeNot will ensure ACID (atomicity, consistency, isolation, and durability) properties or will be shown to be cheating.

3. TrustMeNot will be able to access only encrypted data.

4. In access privacy mode (in which 26A, 26B, 26C and 26 of storage device 24 contain the same data items), TrustMeNot will learn nothing about the access patterns of users. That is, if a user accesses data item x, software at TrustMeNot will not know this. If user u1 accesses x and u2 accesses x, TrustMeNot won't know that they access the same data.

5. In blob mode (in which for example 26 may contain data items in neither 26A nor 26B), client accesses to all data aside from blobs will be access private, but accesses to blobs will not be. This mode is for databases having large data objects such as images.

The system 10 performs well, never aborts transactions, and is wait-free in one mode and altruistically wait-free (as is described below) in another. It will be shown below that the system 10 (which we call OutSafe) is a deployable solution to the secure database outsourcing problem.

The basic architecture of the system 10 is that every client holds a full copy of the database 26 (i.e. 26A, 26B, and 26C hold the same data items and database 26 contains a possibly older version of the database as well as a log of transaction descriptions). Read-only transactions are completely local. Clients send read-write transaction descriptions to a "Conduit 22" (see FIG. 1). The Conduit 22 records the order of arrival of the transactions and sends those transaction descriptions in their arrival order to all clients as well as to a reliable backend (storage device 24) owned and operated by TrustMeNot. A "transaction description" is literal text, e.g. the text "purchase ('flashdrive', 'xmem corporation', 2000, 3.00)" which will execute the procedure purchase having formal parameters productname, supplier, quantity, price. That procedure will in general have control flow (if-then-else) as well as database accesses in SQL or another language. For this to work well, all clients must have identical or effectively identical data access software. (Effectively identical means that the software will perform the same way on the same data.) When the transaction description is encrypted TrustMeNot will not know what it contains. A transaction commits when one of its descriptions (normally, the first transaction description) is written (in encrypted form) to that backend. On the client, in one embodiment, each read-write transaction executes in a manner equivalent to a single-threaded execution in the order it is received from the Conduit 22. (The Conduit 22 may choose various criteria for ordering the transactions, e.g. based on the timestamp on each transaction. Whatever the ordering criteria is, clients must execute the transactions according to that ordering or in a way that is equivalent to that ordering.) A read-only transaction T executes on the state of the committed database 26 at the time T begins. For example, if the local client database 26 supports multiversion read consistency, then read-only transactions may execute in parallel with one another and with read-write transactions.

Proposition 1: Assuming (i) the Conduit 22 sends read-write transactions to clients in the order of their arrival at the Conduit 22, (ii) each client executes read-write transactions serially, and (iii) each client executes each read-only transaction T in such a way that T accesses only data of committed transactions that have completed before T begins, serializability is guaranteed.

A transaction is deterministic if the values that it writes into the database 26 and the values that it returns to a calling program depend only on the contents of the database 26.

Proposition 2: Suppose (i) all read-write transactions are deterministic, (ii) read-write transactions execute serially on each client and in the same order, and (iii) all clients begin in the same state. Then two clients will be in the same state after the kth read-write transaction for all k.

Because of proposition 2, the state of a client's database 26 following the nth read-write transaction is well-defined, and we will call it the n-state. Further, it is possible for a client to arrive at the n-state by recovering the k-state for k<n and then replaying the read-write transactions k+1 . . . n in order. One implication is that if a client fails, it can either recover its state by replaying all transactions from the initial database 26 state (which may be the empty state) or from a more recent state provided by another client or perhaps from an encrypted copy of the reliable backend of TrustMeNot.

OutSafe requires only a few changes to a native single-user implementation to make it distributed, fault-tolerant and secure. The basic idea is that a client machine incorporates a new module: the OutSafe Security Module. The OutSafe Security Module mediates between the client user interface the Conduit 22 and the client local database, e.g. 26A.

For example, suppose a single-user implementation wraps all its read-write transactions into procedures. Any read-only transaction proceeds as usual. A procedure P encapsulating a read-write transaction is contained within a wrapper procedure that calls the local OutSafe Security Module with the text "P (actual parameters to P)". The Security Module then sends that text (in encrypted form if the Conduit 22 or transmission line is untrusted) to the Conduit 22. The Conduit 22 sends the text and a sequence number to the reliable backend of Trust-MeNot and then back to all clients. When this client's Security Module receives the text for this transaction, it returns control to the wrapper which then executes P. If a call to procedure P originates at another client, then when the Conduit 22 sends text concerning the call to P to the OutSafe Security Module, the Security Module decrypts the text if necessary and executes P directly, discarding any return values.

Figure 1:
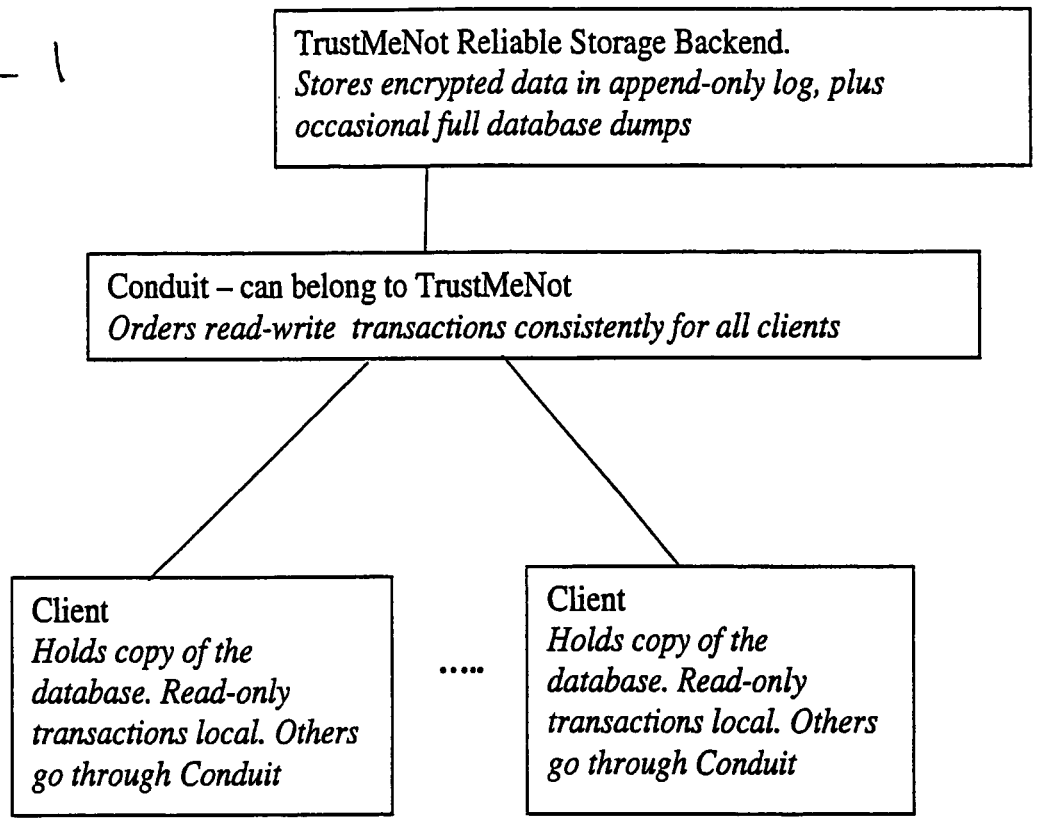
FIG. 1 shows a general architecture of the system.

FIG. 1 shows a general architecture of the system 10. In this embodiment, client machines should have sufficient storage to hold the entire database 26. Read-only transactions access that local database 26. Read-write transactions go through the Conduit 22. Client machines need not be particularly reliable as they can recover the database 26 state from other clients or from the reliable backend storage. The Conduit 22 orders read-write transactions consistently for all clients and saves the text describing the transaction (e.g. SQL statements and control flow) in encrypted form in the TrustMeNot Reliable Backend. If the Conduit 22 belongs to TrustMeNot or if the client-to-Conduit 22 transmission line is insecure, then the client sends transactions to the Conduit 22 in encrypted form.

When a read-write transaction is initiated at a client other than c, the Outsafe Security Module of c receives the transaction description, decrypts it, and then executes it locally. If the transaction returns some values, the Outsafe Security Module discards them as they are interesting only to the originating client. It is noted that this algorithm is client-side wait-free, because no client ever waits for another.

A client user interface may include a graphical user interface but each transaction should be enclosed in a procedure in the preferred embodiments. Moreover, transactions should be deterministic (i.e. they should contain no randomness or time-dependence). Their actions and return value should depend only on the state of the database 26 and a deterministic program. Client transaction calls pass through the Outsafe security module. If a transaction is read-only, it can directly execute on the local database 26 as soon as all previous read-write transactions have completed. If a transaction is read-write, then the Outsafe Security Module sends the transaction description to the Conduit 22. The Client Local Database 26 need not support concurrency control or database 26 recovery, but must be capable of executing a stream of serial transactions. If the local client supports multi-version read consistency, then read-only transactions may execute at any time.

If the Conduit 22 is part of TrustMeNot, it may prove adversarial and attempt to deceive clients so different clients acquire inconsistent views of the database 26 state. For example, if client c1 issues read-write transaction t1, and c2 issues t2, then the Conduit 22 might send t1 to c3 but not t2. Client c3 may then issue t3 and, if both c1 and c2 execute t3, they will be in different states. The Blind Stone Tablet [1] technique of ensuring fork consistency [14] using hash chains is followed. Out-of-band communication among clients with hash chaining ensure that the Conduit 22 sends all transactions in the same order to all clients or the Conduit's 22 misbevior will be discovered.

The idea is briefly discussed here. A hash chain starts with some initial seed value v. Each transaction k has an associated hash value which is computed as $h_k = H(h_{k-1}, \text{transaction k text})$. Here H is shared among the clients. That is, the hash chain looks like (where $t_i$ is the transaction description of transaction i):

$$h_0 = H(v)$$

$$h_1 = H(h_0, t_1)$$

$$h_2 = H(h_1, t_2)$$

When a client c1 sends a read-write transaction to the Conduit 22, it sends (as part of its encrypted message) the transaction sequence number j of the last read-write transaction it has heard about from the client along with its hash chain value $h_j$. When a different client c2 receives the encrypted transaction text, it checks that its own record of the jth transaction is also associated with $h_j$. If so, then c1 knows it is consistent with c2 at least up to transaction j. That is, it has executed the same transactions in the same order.

There is one remaining issue: the Conduit 22 could "fork" c1 and c2, so that c1 never sees the transactions of c2 and vice versa. To detect this, c1 and c2 periodically need to engage in an out-of-band communication in which they exchange their latest hash chain values. That is, suppose c1 sends $(j1, h_{j1})$ and c2 sends $(j2, h_{j2})$. Without loss of generality, suppose $j1 \leq j2$. Then c1 and c2 can determine whether they have received the same transactions in the same order up to j1 by checking whether the $h_{j1}$ value from c1 is equal to the hash value held by c2 for transaction j1.

Even if every client has enough disk space to hold the entire database 26, it may be the case that it doesn't have an equally powerful processor, an equally fast or large memory 32, or it may be that the client device 28 is simply off part of the day. The net result is one client may be effectively behind another. The Altruistic Optimization helps slow clients catch up.

The first client to finish any read-write transaction, sends a special "shortcut" (a second transaction description) to all other clients (through the Conduit 22 or not). The shortcut tells the other clients which records to modify or insert and how. For example, if a transaction reads the entire employee table and then inserts a record containing the monetary value M of the sum of weekly salaries in a summary table, the shortcut may specify the insert using the value calculated by the first client. If a client is catching up on read-write transactions issued by other clients, it can execute the transactions themselves or the shortcuts. As long as it executes the shortcuts in the proper order, it will produce the same database 26 state after completing transaction j as every other client as of transaction j.

There is a second use of shortcuts (second transaction descriptions). Suppose that the clients want to keep data private from one another. The system 10 gives the option to have a second layer of encryption or even more. The first layer is to prevent TrustMeNot from seeing the data in cleartext. A second layer (using a new encryption key) might be for clients c1 and c2 to prevent client c3 from seeing some data in the clear. A third layer (using yet another encryption key) might be that x doesn't want c2 to see all of c1's data and perhaps c3 has some data that it wants neither c1 nor c2 to understand so c3 uses yet another encryption key for that. Portions of transaction descriptions may also be encrypted. The net effect is that a given client c may not be able to execute a transaction description. In that case, a shortcut is a mechanism to allow a client c1 to execute a transaction and then inform other clients (through modified transaction descriptions) which operations on data they should execute to effect the same change in the database 26 state that c1 performed. Note that instead of holding data encrypted in a client memory using an encryption key that the client doesn't hold, the client need not hold that data at all. If there is a data item x that a client either doesn't hold or that is encrypted in a way that the client cannot decrypt it, then we say the client "doesn't understand" that data. Note also that a given original transaction description for transaction t can give rise to several shortcuts (several subsidiary transaction descriptions). These are all considered to be "second transaction descriptions" for the purposes of this invention.

There is a third use of shortcuts (second, third, fourth . . . transaction descriptions). It is possible that some client s may not hold the entire database 26. In that case, s may not be able to perform some transaction T, because the transaction may depend on part of (data items of) the database 26 that s does not hold. However, s would like to maintain the portion of the database 26 that it does hold up to date. So, s can read the shortcut for transaction T and apply modifications (for example, updates, deletes, and/or inserts) to the portion that s holds. Note that if a first or second transaction description for transaction T refers to data that the client does not hold, the client can simply ignore updates to those data items.

A possible use of a large reliable storage mechanism is to store large objects, e.g. images and movies or large but rarely used tables. Customer may want to store such objects in encrypted fashion and then fetch them from time to time. Fetching large blobs violates access privacy, but may be necessary. The next question is how to read and modify blobs efficiently. For read-only transactions, the client fetches the blobs it needs and processes them locally. It will need locks as explained below.

Figure 2:
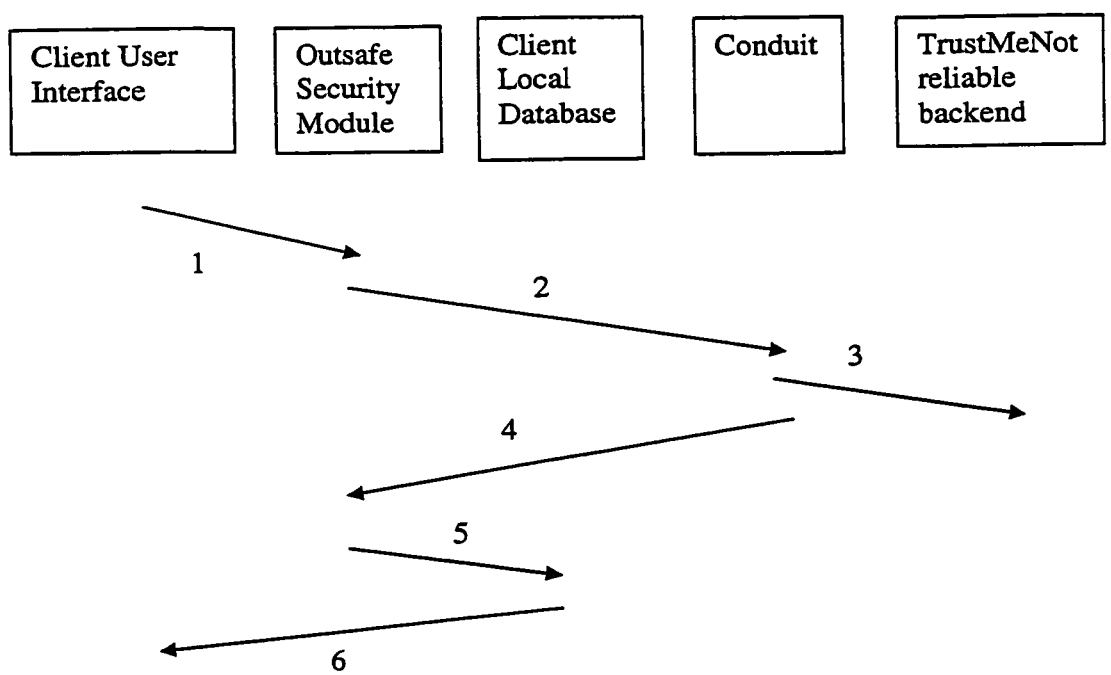
FIG. 2 shows a read-write transaction initiated from a local client.

FIG. 2 shows a read-write transaction initiated from local client. (1) The Client User Interface sends the transaction description (in practice a procedure call) to the Outsafe Security Module. If the transaction is read-only, it goes directly to the Client Local Database. (2) In this case, the transaction is read-write, so the Outsafe Security Module sends the transaction description (possibly encrypted) to Conduit 22. (3) Conduit 22 assigns the next transaction number to the transaction description and sends it (encrypted at this point) to the TrustMeNot fault tolerant backend. (4) The Conduit 22 sends the transaction number and transaction description to the Outsafe Security Module of all clients. (5) The Outsafe Security Module decrypts the transaction description if necessary and (when it is the turn for this transaction) executes the cleartext on the Client Local Database. (6) The transaction executes on the local database and, if the transaction returns values, then those return values go to the Client User Interface (where they will be discarded for any client other than the initiating/originating client).

For read-write transactions that read one or more blobs but then modify other data, the naive extension to our basic architecture would be very inefficient, viz. every client would have to download the blobs and then do all the work. Instead, a strategy is used similar to the altruistic optimization. That is, one client (it doesn't have to be the originating client) accesses the blobs and then figures out what modifications, insertions, and deletions all other clients have to do. It then specifies them in the form of a shortcut (second transaction description).

This idea might not, however, improve total system 10 throughput if all clients must wait for the blob-accessing client before they do any other work. So the preferred embodiment will use locking. However, the locking will be done in such a way as to guarantee a consistent order of read-write transactions across clients, avoid deadlocks, and achieve "altruistic wait-freedom".

To begin, it is supposed that client sites will hold indexes to blobs, though not the blobs itself. The protocol for read-write transaction k that accesses blobs works in three phases.

I) Announcement phase: client sends a message through the Conduit 22 containing a list of read and write locks that all clients must hold along with the transaction text (first transaction description) for transaction k.

II) Performance phase: Once a client c obtains all required locks for transaction k (see locking notes below), c (normally the originating client, but not necessarily) accesses the TrustMeNot-resident blobs and if it must modify that data, the client creates new version of the blobs in new locations—no update in place. Client c also computes the changes to client-resident data.

III) Completion phase: client c then sends a message through the Conduit 22 containing any modifications that all clients must do including any changes to blob indexes for transaction k, thus constituting the second transaction description. If client c is not the originating client, then client c also informs all other clients of the return values of the transaction if any. Each client, once it has all the locks needed for transaction k, performs those updates and then releases (unlocks) all the locks for transaction k.

Normal transactions (ones that don't access blobs) execute in each client by acquiring locks on all items they need, accessing the data once acquisition is complete, and then releasing the locks.

Example: Suppose that T is a transaction that accesses blobs. Suppose that the underlying logic of the transaction is: "if $x>5$ then modify y and return its size else modify z and return its size." The originating client c for T determines (either by code inspection or based on some information the programmer provides) that x could required shared access and y and z could require exclusive access. (Note that in any execution, only one of y or z will be modified and therefore require exclusive access.) If x, y, and z are all client-resident, then the originating client c informs other clients to obtain a shared lock on x, and exclusive locks on y and z and then to execute the transaction T. On the other hand, if at least one of x, y, and z is not client-resident (i.e. is a server blob), then the three phase protocol above applies: (i) the originating client c performs the announcement phase (preferably through the conduit 22, though a broadcast mechanism would also be possible) telling the other clients to obtain a shared lock on x, and exclusive locks on y and z. (ii) some client (perhaps not c) performs the steps of the transaction, determines whether $x>5$ and, if so, accesses y, modifies y, determines any changes to the index for y, and computes the resulting size of y; if not, accesses z, modifies z, determines any changes to the index for z, and computes the resulting size of z. (iii) the client of step (ii) then performs the completion phase by informing other clients (in a second transaction description also known as a shortcut) of any changes to their indexes and also the size it computed. Other clients, once all locks for transaction T are obtained, follow the instructions of the second transaction description.

When a client receives a transaction announcement that includes a command to acquire a read or write lock on data item x on behalf of a particular transaction T, it adds that request to the lock queue for x. Transaction T is said to hold a read lock on x if T's read lock request is not preceded by any write lock request on x that is still active (i.e. there has been no unlock). Transaction T holds a write lock on x if T's write lock request is not preceded by any active read or write lock request on x.

Proposition: This protocol cannot deadlock.

Theorem 1: All read-write transactions execute on every client site in an order equivalent to a serial execution in the order received from the Conduit 22.

Theorem 2: Assuming read-only transactions acquire read locks for all data items they access, all transactions at each client site execute serializably in an order that is consistent with the order of read-write transactions.

Observation: Read-only transactions may not use multiversion read consistency in this preferred embodiment, because they can change the serialization order of read-write transactions. Here is an example. Suppose that x=y=10 initially. T1: x:=2*x; T2: y:=3*y; and T3: return x+2y. Suppose T1 has the lowest transaction number and acquires its lock on x at time t=1, but does not commit until t=5. T2 acquires its lock on y at time t=2 and commits at time t=3. T3 begins at t=4. Then T3 will read 10 for x and 30 for y obtaining a value of 70, because T2 has committed but T1 hasn't. So the equivalent serialization order would be T2 T3 T1. Note that if T3 used read locks, then it would wait for T1 to complete before beginning (because of the lock conflict on x) and T2 would wait for T to complete before beginning (because of the lock conflict on y). So, T3 would obtain a value of 50.

Note that a client (denoted the altruistic client) other than the originating one may perform the access to the server-resident data and then complete the transaction. (If that client fails after writing the server-resident data to a new location, another client can perform the same operation. That is why updates are not in-place in the preferred embodiment.) Thus, even though server-resident data entails the holding of locks, the system 10 is "altruistically wait-free" because other clients can take over from a client site that has either failed or is delayed.

All efforts to enhance data security negatively impact performance. Doing operations on encrypted databases hurts performance. Private information retrieval is mildly to very expensive. All those efforts pertain to systems that achieve only some of the functionality of a database 26 management system and do so with lesser guarantees. It is with some surprise therefore that we can assert that the performance (throughput and response time) of read-write transactions is about the same in OutSafe as in a vanilla insecure system. For read-only transactions, OutSafe gives better performance.

OutSafe provides support for arbitrary distributed database transactions. The system guarantees the ACID (atomicity, consistency, isolation, and durability) properties, wait-freedom and performs particularly well if the ratio of read-only transactions to read-write transactions is high. Two levels of privacy have been presented: for small databases (that can fit inside a client device 28), we guarantee full access privacy. For larger databases, we guarantee access privacy to all non-blob data.

A related application, "Database Outsourcing with Access Privacy," having U.S. patent application Ser. No. 12/321,326 is incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

REFERENCES, all of which are incorporated by reference herein.
1. "The Blind Stone Tablet: Outsourcing Durability" Peter Williams, Radu Sion, Dennis Shasha 16th Annual Network and Distributed System Security Symposium, 2009
2. "Generalizing Data to Provide Anonymity when Disclosing Information" Pierangela Samarati and Latanya Sweeney ACM PODS 1998
3. "Keep a Few: Outsourcing Data While Maintaining Confidentiality" Valentina Ciriani, Sabrina De Capitani di Vimercati, Sara Foresti, Sushil Jajodia, Stefano Paraboschi, Pierangela Samarati ESORICS, 2009 pp. 440-455
4. "Using secret sharing for searching in encrypted data" R. Brinkman, J. Doumen, and W. Jonker. In Secure Data Management, 2004.
5. "A privacy-preserving index for range queries" B. Hore, S. Mehrotra, and G. Tsudik. ACM SIGMOD, 2004.
6. "Verifying Completeness of Relational Query Results in Data Publishing" HweeHwa Pang, Arpit Jain, Krithi Ramamritham, Kian-Lee Tan. ACM SIGMOD, 2005
"Answering aggregation queries in a secure system model" Tingjian Ge and Stan Zdonik. Proceedings of the 33rd international conference on Very large data bases, pages 519.530. VLDB Endowment, 2007.
8. "Executing SQL over encrypted data in the database-service-provider model" H. Hacigumus, B. Iyer, C. Li, and S. Mehrotra ACM SIGMOD pages 216.227. ACM Press, 2002.
9. "Forensic Analysis of Database Tampering" Kyriacos Pavlou and Richard T. Snodgrass. ACM SIGMOD, 2006.
10. "Tamper Detection in Audit Logs" Richard T. Snodgrass, Stanley Yao, Christian Collberg In Proceedings of VLDB, 2004.
11. "Authentication and integrity in outsourced databases" E. Mykletun, M. Narasimha, and G. Tsudik. Proceedings of Network and Distributed System Security (NDSS), 2004.
12. "Using Codewords to Protect Database Data from a Class of Software Errors Philip Bohannon, Rajeev Rastogi, S. Seshadri, Avi Silberschatz, S. Sudarshan. In Proceedings of ICDE, 1999.
13. "Usable PIR" Peter Williams and Radu Sion. In Proceedings of the 2008 Network and Distributed System Security (NDSS) Symposium, 2008.
14. "Building secure file systems out of Byzantine storage" David Mazieres and Dennis Shasha, Principles of Distributed Computing, 2002. pp. 108-117.

The invention claimed is:
1. A computer system comprising:
a network;
a first client device in communication with the network having a first transaction description for a transaction t and sending said first transaction description to a second client device in communication with the network, the second client device receives the first transaction description from the first client device, one of said first or second client devices executes the first transaction description and creates a second transaction description for transaction t which tells which records to modify or insert and how for transaction t and then sends the second transaction description to a client device, the first and second client devices each having a database;

a storage device having a database wherein said storage device is in communication with the first and second client devices through the network, the first and second client devices each having a copy of a portion of the database of the storage device where the portion of the storage device's database of the first device is allowed to be different from the portion of the storage device's database of the second device, each client device has at least a portion of a copy of data in the database and performs at least a portion of reads of transactions at each of said client devices on the portion of the copy of the data in the storage device's database that each client device also has; the copy of the portion of the storage device's database that each client device has is subject to access privacy because all data accesses that go to each client's database, have a property that the storage device does not know which data items are in each copy of the portion of the storage device's database of the first or second client devices nor does the storage device know which data items are accessed nor whether a same data item is accessed more than once, the storage device receives only encrypted data 1; the storage device is a backup for data of each client device so if any client device needs to recover data, the data is able to be retrieved from the storage device; and a conduit which orders transactions in communication with the storage device and each client device through the network, wherein all read-write transactions pass through the conduit so that read-write transactions are executed in a same order in every client.

2. The system as described in claim 1 wherein said first client device has a processing unit and said first client device executes the first transaction description and the first client device is able to understand all the data read in said first transaction description, and the second client device is not able to understand all the data in said first transaction description.

3. The system as described in claim 2 wherein the second client device performs the second transaction description.

4. The system as described in claim 3 wherein the second client device database has records and the second transaction description from the first client device informs the second client device which records to modify or insert and how to modify or insert the records.

5. The system as described in claim 1 wherein the second client device performs the first transaction description and sends said second transaction description to the first client device.

6. The system as described in claim 1 including a third client device in communication with the network, and wherein the second client device executes the first transaction description and the third client device does not understand all the data read in the first transaction description.

7. The system as described in claim 1 wherein the conduit orders read-write transactions consistently for all clients.

8. The system as described in claim 7 wherein the conduit saves the transaction description text describing the transaction description in encrypted form in the storage device.

9. The system as described in claim 1 wherein said first transaction description entails an access to data in the database of the storage device and said first transaction description further enables:
   i) at least one of said first or second client devices, denoted cA, accesses data on the database of the storage device and, if the data in the database is changed, client device cA copies and stores the changed data in a new location on said storage device; and
   ii) at least client device cA obtains shared or exclusive access to some data determined by said first transaction description.

10. The system of claim 9 wherein said first transaction description further enables the obtaining of shared or exclusive access to occur on at least client device cA before any data pertaining to said first transaction description is accessed on cA.

11. The system of claim 1 wherein said first transaction description enables encryption of data on one of said first and second client devices to prevent at least one client device from being able to produce cleartext data from some encrypted data.

12. The system of claim 9 including instructions in which each transaction is to be executed in three phases:
   i) an announcement phase in which said first client device of said transaction description informs, either directly or indirectly through the conduit, at least said second client device of the data on which the said second client device must gain shared or exclusive access;
   ii) a performance phase in which at least one of said first and second client devices c1 accesses at least some of the data pertaining to the transaction description; and
   iii) a completion phase in which client device c1 sends a message, directly or indirectly through the conduit, to another client device said second transaction description that the other client device must perform on data contained within the other client device.

13. The system of claim 12 wherein the instructions further enable the client device c1, if it is not said first client device, to inform said first client device what return values of the transaction should be.

14. A client device of a computer system having a network, a storage device, a conduit, and at least one other client device, the client device comprising:
   a network interfacing unit in communication with the second client device, the storage device and the conduit through the network;
   a database;
   a transaction description for a first transaction t, the network interfacing unit sending said first transaction description to the one other client device also having a database, the database and the database of the one other client device each have at least a portion of a copy of data in a database of the storage device; the data that the client device and one other client device has is subject to access privacy because any data accesses of the client device that go to the database of the client device and the database of the one other client device are not visible outside of the client device and the one other client device, so the storage device does not know which data items are in each copy of the portion of the database of the client device and one other client device nor does the storage device know which data items are accessed nor whether a same data item is accessed more than once, the client device and the one other client device, each having a copy of a portion of the storage device's database where the portion of the storage device's database of the client device is allowed to be different from the portion of the global database of the one other device; and a processing unit for executing the first transaction description to create a second transaction description for transaction t which identifies which records to modify or insert and how for transaction t, the network interfacing unit sends the second transaction description to the one other client device through the network, the processing unit performing at least a portion of read-only transactions locally on the portion of the copy of the data in the database of the client device and in the database of the one other client device, and the storage device receives only encrypted data, the storage device is a backup for data of each client device so if any client device needs to recover data, the data is able to be retrieved from the storage device, the processing unit sending through the network interfacing unit all read-write transactions through the conduit, which orders transactions so that read-write transactions are executed in a same order in the client device and the one other client device.

15. A method of a computer system comprising the steps of:

sending a transaction description for a first transaction t from a first client device to a second client device through a network, the first and second client device each having a database, the first and second client devices each have at least a portion of a copy of data in a database of a storage device in communication with the first and second client devices through the network, and the first and second client devices perform at least a portion of read-only transactions locally on the portion of the copy of the data in the database that each client device also has; the data that each client device has is subject to access privacy because all data accesses go to each client's local database and the storage device does not know which data has been accessed, and the storage device receives only encrypted data, the storage device is a backup for data of each client device so if any client device needs to recover data, the data is able to be retrieved from the storage device, so the storage device does not know which data items are in each copy of the portion of the database of the first and second client devices nor does the storage device know which data items are accessed nor whether a same data item is accessed more than once, each client device having a copy of a portion of the storage device's database where the portion of the storage device's database of the client device is allowed to be different from the portion of the storage device's database of the second device;

receiving at the second client device the transaction description from the first client device;

executing by one of said first or second client devices the transaction description to create a second transaction description for transaction t which identifies which records to modify or insert and how for transaction t;

sending the second transaction description to a client device through the network; and sending all read-write transactions through a conduit, which orders transactions so that read-write transactions are executed in a same order in every client, in communication with the storage device and each client device through the network, the conduit saves text describing each read-write transaction in encrypted form in the storage device.

16. A method of a first client device of a computer system having a network and a second client device and a storage device and a conduit, the method comprising the steps of:

sending a transaction description for a transaction t stored in a database of the first client device from a network interfacing unit to the second client device, which also has a database, through the network, the transaction description for transaction t identifies which records to modify or insert and how for transaction t, the network interfacing unit in communication with the second client device, the storage device and the conduit through the network, the first client device having at least a portion of a copy of data in a database of the storage device, and the first client device performs at least a portion of read-only transactions locally on the portion of the copy of the data in the database that each client device also has so the data that each client device has is subject to access privacy because all data accesses that go to the data in said client device are undetected by the storage device, and the storage device receives only encrypted data, the storage device is a backup for data of each client device so if any client device needs to recover data, the data is able to be retrieved from the storage device, so the storage device does not know which data items are in each copy of the portion of the database of the first client device and second client device nor does the storage device know which data items are accessed nor whether a same data item is accessed more than once, the first client device and the second client device, each having a copy of a portion of the storage device's database where the portion of the storage device's database of the first client device is allowed to be different from the portion of the storage device's database of the second device;

executing with a processing unit the transaction description from the memory and creating a second transaction description for transaction t;

sending the second transaction description from the network interfacing unit to a client device through the network; and sending all read-write transactions from the network interfacing unit through a conduit, which orders transactions so that read-write transactions are executed in a same order in every client device, the conduit in communication with the storage device and each client device through the network, the conduit saves text describing each read-write transaction in encrypted form in the storage device.

17. The system of claim 1 wherein when the first client device accesses a data item of the data in the storage device, the storage device does not know that the first client device has accessed the data item in the storage device.

18. The client device of claim 14 wherein when the processing unit through the network interfacing unit accesses a data item of the data in the storage device, the storage device does not know that the first client device has accessed the data item in the storage device.

19. The method of claim 15 including the step of the first client device accessing a data item of the data in the storage device, the storage device does not know that the first client device has accessed the data item in the storage device.

20. The method of claim 16 including the step of the processing unit through the network interface unit accessing a data item of the data in the storage device, the storage device does not know that the first client device has accessed the data item in the storage device.

21. A computer system comprising:
a network;

a first client device in communication with the network having a first transaction description for a transaction t and sending said first transaction description to a second client device, the second client device receives the first transaction description from the first client device, one of said first or second client devices executes the first transaction description and creates a second transaction description for transaction t and then sends the second transaction description to a client device, the first and second device each having a database, the second client device database has records and the second transaction description from the first client device informs the second client device which records to modify or insert and how to modify or insert the records;

a storage device having a database having data wherein said storage device is in communication with the first and second client devices through the network, each client device has at least a portion of a copy of the data in the storage device's database and performs at least a portion of read-only transactions locally on the portion of the copy of the data in the storage device's database that each client device also has so the data that each client device has is subject to access privacy because all data accesses go to each client's local database and the storage device does not know the data has been accessed; and a conduit which orders transactions in communication with the storage device and each client device through the network, wherein all read-write transactions pass through the conduit so that read-write transactions are executed in a same order in every client.

* * * * *